3,274,144
LUBRICATED POLYCARBONATE COMPOSITIONS
Henno Keskkula and Cleown A. Leatherman, Midland, Mich., assignors to The Dow Chemical Company, Midland, Mich., a corporation of Delaware
No Drawing. Filed Jan. 2, 1962, Ser. No. 163,873
8 Claims. (Cl. 260—32.6)

This invention relates to polycarbonate plastics. More particularly, this invention is concerned with polycarbonate resin compositions having improved characteristics.

Among the newer important synthetic plastic polymers are the polycarbonates. These are condensation polymers in which the organic moieties are joined by carbonate linkages. Polycarbonates are excellent molding materials as products made therefrom have high strength, toughness and heat stability. Polycarbonates, are however, very difficult to fabricate from melts for the reason that melts thereof have exceptionally high viscosities. Attempts to overcome this difficulty by the incorporation with the polycarbonate plastic of materials known to reduce the viscosity of other resins have very generally been unsuccessful. Many standard viscosity control agents appear to have little or no effect on the viscosity of polycarbonates. Other compounds known to lower the viscosity of resins cause severe degradation of polycarbonate resins. Some compounds conventionally employed to improve the workability of polymers produce an embrittling effect on polycarbonates when they are mixed therewith and the resin is subjected to elevated temperatures as in molding. Still other materials while satisfactory stiffness modifying agents for other plastics are too volatile to be incorporated with polycarbonates since polycarbonates have much higher melting points than many other thermoplastics.

It is, therefore, among the objects of the present invention to provide a novel composition of matter. Another object of this invention is the provision of a composition comprising a polycarbonae resin having reduced melt viscosity. A further object of this invention is the provision of a polycarbonate composition having improved melt viscosity and which does not become brittle or degraded upon being molded.

The above and other objects and advantages of this invention are obtained in a composition comprising a polycarbonate plastic and small amount of an amide having the general formula

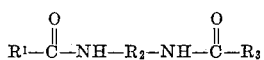

in which $R_1$ and $R_3$ are higher aliphatic hydrocarbon radicals and $R_2$ is a lower alkylene group. By the term lower alkylene group as used throughout the specification is meant an alkylene group having from 2 to 8 carbon atoms and by the term higher aliphatic hydrocarbon radical is means a hydrocarbon radical having at least 10 carbon atoms, for example from 12 to about 20 carbon atoms.

Polycarbonate resins that can be used in accordance with this invention can be produced in a number of ways from a rather large variety of organic dihydroxy compounds, including aliphatic, cycloaliphatic and aromatic dihydroxy compounds. Representative specific examples of aliphatic dihydroxy compounds from which thermoplastic polycarbonate resins can be made are ethylene glycol, diethylene glycol, triethylene glycol, polyethylene glycol, thiodiglycol, ethylene dithiodiglycol, dipropyleneoxide, polypropyleneoxide, 1,3-propanediol, 1,3-butanediol, 1,4-butanediol, 2-methyl-1,3-propanediol, 1,5-pentanediol, 2-ethyl-1,3-propanediol, 1,6-hexanediol, 1,8-octanediol, 1-ethyl-1,3-hexanediol and 1,10-decanediol.

Examples of cycloaliphatic dihydroxy compounds from which polycarbonate plastics can be derived are 1,4-cyclohexanediol, 1,2-cyclohexanediol, 2,2-di(4-hydroxycyclohexylene)propane and 2,6-dihydroxydecahydronaphthylene. As aromatic dihydroxy compounds, there may be mentioned hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2'-dihydroxydinaphthyl-1,1' and ortho, meta and parahydroxybenzyl alcohol.

Among the aromatic dihydroxy compounds, the di(hydroxyaryl) compounds, for example the di(hydroxyaryl)-alkanes and the di(hydroxyaryl)sulphones have been found to be particularly satisfactory. Examples of this class of compounds are di(4-hydroxyphenyl)methane,
1,1-di(4-hydroxyphenyl)ethane,
1,1-di(4-hydroxyphenyl)propane,
1,1-di(4-hydroxyphenyl)butane,
1,1-di(4-hydroxyphenyl)-2-methylpropane,
1,1-di(4-hydroxyphenyl)heptane, and
1,1-di(4-hydroxyphenyl)-1-phenylmethane.

Furthermore, di(4-hydroxyphenyl)-4-methylphenylmethane,
di(4-hydroxyphenyl)-4-ethylphenylmethane,
di(4-hydroxyphenyl)-4-isopropylphenylmethane,
di(4-hydroxyphenyl)-4-butylphenylmethane,
di(4-hydroxyphenyl)benzylmethane,
di(4-hydroxyphenyl)-α-furylmethane,
2,2-di(4-hydroxyphenyl)propane,
2,2-di(4-hydroxyphenyl)butane,
2,2-di(4-hydroxyphenyl)pentane,
2,2-di(4-hydroxyphenyl)-4-methylpentane,
2,2-di(4-hydroxyphenyl)heptane,
2,2-di(4-hydroxyphenyl)octane,
2,2-di(4-hydroxyphenyl)nonane,
1,1-di(4-hydroxyphenyl)-1-phenylethane,
3,3-di(4-hydroxyphenyl)pentane,
4,4-di(4-hydroxyphenyl)heptane,
1,1-di(4-hydroxyphenyl)cyclopentane,
1,1-di(4-hydroxyphenyl)cyclohexane,
2,2-di(4-hydroxyphenyl)decahydronaphthalene,
2,2-di(4-hydroxycyclohexyl)propane,
2-(4-hydroxy-3-methylphenyl)-2-(4-hydroxyphenyl) propane,
2-(4-hydroxy-3-isopropylphenyl)-2-(4-hydroxyphenyl) butane,
1,1-di(4-hydroxy-3-methylphenyl)cyclohexane,
2,2-di(4-hydroxy-3-butylphenyl)propane,
2,2-di(4-hydroxy-3-phenylphenyl)propane,
2,2-di(4-hydroxy-2-methylphenyl)propane,
1,1-di(4-hydroxy-3-methyl-6-butylphenyl)butane,
1,1-di(4-hydroxy-3-methyl-6-tert.butylphenyl)ethane,
1,1-di(4-hydroxy-3-methyl-6-tert.butylphenyl)propane,
1,1-di(4-hydroxy-3-methyl-6-tert.butylphenyl)butane,
1,1-di(4-hydroxy-3-methyl-6-tert.butylphenyl)isobutane,
1,1-di(4-hydroxy-3-methyl-6-tert.butylphenyl)heptane,
1,1-di(4-hydroxy-3-methyl-6-tert.butylphenyl)-1-phenylmethane,
1,1-di(4-hydroxy-3-methyl-6-tert.butylphenyl)-2-methylpentane,
1,1-di(4-hydroxy-3-methyl-6-tert.butylphenyl)-2-ethylhexane,
1,1-di(4-hydroxy-3-methyl-6-tert.amylphenyl)butane,
di(4-hydroxyphenyl)sulphone,
di(2-hydroxyphenyl)sulphone,
di(3-hydroxyphenyl)sulphone, di(4-hydroxy-2-methylphenyl)sulphone,
di(4-hydroxy-3-methylphenyl)sulphone,
di(2-hydroxy-4-methylphenyl)sulphone,
di(4-hydroxy-2-ethylphenyl)sulphone,
di(4-hydroxy-3-ethylphenyl)sulphone,
di(4-hydroxy-2-tert.butylphenyl)sulphone,
di(4-hydroxy-3-tert.butylphenyl)sulphone, and
di(2-hydroxynaphthyl)sulphone.

Among the great number of available di(hydroxyaryl)-alkanes, the di(4-hydroxyphenyl)alkanes are preferable, especially 2,2-di(4-hydroxyphenyl)propane. Mixed polycarbonates having special properties can be prepared from two or more different dihydroxy compounds such as a mixture of at least one aromatic dihydroxy compound with one or more aliphatic dihydroxy compounds. It is advantageous that the polycarbonates employed in this invention be resinous materials of relatively high molecular weight, for example in excess of about 10,000.

Thermoplastic polycarbonates can be produced by re-esterifying the dihydroxy compound of the type mentioned above or mixtures thereof with a diester of carbonic acid. Examples of such diesters are dimethylcarbonate, diethylcarbonate, dipropylcarbonate, dibutylcarbonate, diamylcarbonate, dioctylcarbonate, dicyclohexylcarbonate, and especially diphenylcarbonate and the para-toluyl carbonates. Mixed esters can be employed, for instance methylethyl carbonate, methylpropyl carbonate, ethylpropyl carbonate, methylcyclohexyl carbonate, ethylcyclohexyl carbonate, propylcyclohexyl carbonate, methylphenyl carbonate, ethylphenyl carbonate, propylphenyl carbonate, cyclohexylphenyl carbonate, and the toluyl carbonates. By re-esterifying the mentioned carbonic acid diesters, the corresponding alkyl or cycloalkyl alcohols for the corresponding phenols are split off.

The thermoplastic polycarbonates utilized in this invention can also be produced by introducing phosgene into solutions of dihydroxy compounds in organic bases such as dimethylaniline, diethylaniline, trimethylaniline and pyridine or in indifferent organic solvents such as petrol, ligroin, cyclohexane, methylcyclohexane, benzene, toluene, xylene, chloroform, methylenechloride, carbon tetrachloride, trichloroethylene, dichloroethane, methylacetate and ethylacetate with the addition of an acid binding agent for example one of the tertiary amines. A process found to be particularly suitable for producing polycarbonate resins comprises introducing phosgene into an aqueous solution or suspension of alkali or alkaline earth metal salts such as lithium, sodium, potassium and calcium salts of the dihydroxy compounds preferably in the presence of an excess of a base such as lithium, sodium, potassium and calcium hydroxide or carbonate. The polycarbonate precipitates out from the aqueous solution and may be recovered therefrom by filtration.

It is also possible to produce the polycarbonate materials employed in the present invention by reacting the above mentioned organic dihydroxy compounds with the bis-chloro-carbonates of such compounds. This condensation proceeds suitably in the presence of inert solvents and acid binding agents such as tertiary amines.

The compositions of the present invention can be obtained by mixing a polycarbonate resin with an amide of the class above defined. Such compounds can be made by reacting long chain fatty acids such as stearic acid, palmitic acid, myristic acid, lauric acid, oleic acid, and linoleic acid with alkylene diamines to form amides such as ethylene bis(stearamide), propylene bis(myristamide), hexamethylene bis(lauramide), and ethylene bis-(palmitamide). The preferred long chain fatty acids are those derivable from animal and vegetable fats and oils. While a single pure fatty acid can be used it is preferred to use the mixtures of fatty acids obtainable from animal and vegetable fats and oils such as lard, tallow, cottonseed oil, olive oil, coconut oil, corn oil, soybean oil and the like. It is preferred that the fatty acids be mostly saturated such as are obtained by the hydrogenation of animal and vegetable oils of the aforementioned types. However, the presence of unsaturated acids is not precluded and may even be desirable in some cases. Among the suitable diamines that can be utilized for reaction with the fatty acids above referred to, the lower alkylene diamines, wherein the alkylene group contains from 2 to 4 carbon atoms, are preferred. Alkylene diamines containing up to 8 or more carbon atoms can, however, be employed. For example, ethylene diamine, propylene diamine, hexylene diamine and 2,6-octylene diamine can be used.

Small amounts of the herein disclosed alkylene bis-(alkylamides) are effective in substantially reducing the melt viscosity of polycarbonate resins. It is found desirable to employ quantities ranging from about ½ percent to about 5 percent of the additive based on the weight of the polycarbonate, although amounts ranging from about 0.1 percent to about 10 percent by weight can usefully be employed.

The compositions of this invention can be prepared in a variety of ways as for example by mixing the polycarbonate with the additive in a Banbury type mixer, a screw extruder, a caplastometer [a device described by H. J. Karam et al. in Modern Plastics, March 19, 1955 (pp. 129 et seq.)] or in any other suitable device.

The examples which follow are illustrative of the present composition but the invention is not limited thereto. Throughout the specification parts and percentages are parts and percentages by weight unless otherwise specified.

EXAMPLE I

An 800 part sample of a polycarbonate resin made by phosgenating a solution of 2,2-di(4-hydroxyphenyl)propane in methylene chloride and having a Fikentscher K value of 51 is dry blended with 24 parts of ethylene bis-(stearamide). The resulting composition is heated in an oven, maintained at a temperature of 120° C., for 16 hours in order to remove the last traces of water. The dried mixture is removed from the oven, is then hot blended and tested for viscosity in a caplastometer. Using a shear stress of 700,000 dynes per square centimeter, there is obtained an apparent viscosity of 4,010 poises at 270° C. This composition is found to be thermally stable at 310° C. For the purpose of contrast, a sample of the unmodified polycarbonate is tested under the same conditions and found to have an apparent viscosity of 40,000 poises.

EXAMPLE II

One hundred parts of a commercial polycarbonate resin made by phosgenating a solution of 2,2-di(4-hydroxyphenyl)propane in methylene chloride is blended in a size "B" Banbury mixer with 1 part of alkylene bis(alkylamide) made by reacting ethylene diamine with hydrogenated tallow. The Banbury is operated at 460° to 470° F. for 10 minutes. This composition is injection molded in a one-ounce Watson-Stillman machine using a 70 second cycle and 13,000 pounds per square inch hydraulic injection pressure. The properties of this composition are given in Table I, infra.

EXAMPLE III

The procedure of Example II is essentially repeated using the same materials except that 3 parts of the alkylene bis(alkylamide) is used with 100 parts of polycarbonate. The physical properties of this material are set forth in the Table I along with the properties of the polycarbonate containing zero percent of the additive for the purpose of contrast (test captioned "Control").

Table I

| | Example II | Example III | Control |
|---|---|---|---|
| Molding Temperature (° F.) | 610 | 575 | 670 |
| Tensile Strength (pounds per square inch) | 9,070 | 9,760 | 8,350 |
| Elongation (percent) | 75 | 41 | 75 |
| Tensile Modulus (pounds per square inch) | 339,000 | 311,000 | 242,000 |
| Flexural Strength (pounds per square inch) | 15,360 | 15,740 | 14,210 |
| Flexural Modulus (pounds per square inch) | 336,000 | 366,000 | 335,000 |

The molding temperature referred to in the table is 25° F. above the temperature (in degrees F.) of the plastic at which a complete well defined molding is obtained.

It will be noted that not only is the molding temperature of the polycarbonate improved, i.e. lowered, in the composition of the present invention but, unexpectedly, that other physical characteristics of the resin are improved as well. It has been found that physical properties of polycarbonate resins other than those listed such as, hardness, notched impact strengths and heat distortion temperatures, are not unduly affected by the incorporation of the viscosity controlling additives employed in the compositions of this invention.

The composition of Example III is further tested for melt viscosity and heat stability in a caplastometer and found to be excellent in these properties. The data are given in Table II along with the data on a control sample of the same polycarbonate without any alkylene bis(alkylamide) modifier.

Table II

| | Melt Viscosity (poises) at 700,000 dynes/sq. cm. | | | |
|---|---|---|---|---|
| | 270° C. | 290° C. | 310° C. | 310° C. (after 10 minutes) |
| Example III | 4,010 | 1,330 | 406 | 377 |
| Control | 40,000 | 24,500 | 11,650 | 9,820 |

In a manner similar to the foregoing examples, polycarbonate plastics obtainable from the organic dihydroxy compounds herein disclosed can be combined with any of the compounds of the general formula

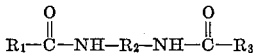

in which $R_1$ and $R_3$ are higher aliphatic hydrocarbons and $R_2$ is a lower alkylene group as hereinabove defined to produce comparable improved characteristics in the resin.

The compositions of this invention can additionally contain, if desired, various modifiers, such as dyes, pigments, fillers, reinforcing materials and other resins and can be fabricated into useful articles such as tubes, rods, bars, gears, cams, switch plates, and toaster parts by conventional shaping techniques, for example, by molding, casting and extrusion.

That which is claimed is:

1. A composition of matter comprising a synthetic organic polycarbonate and from about 0.1 percent to about 10 percent of a compound of the general formula

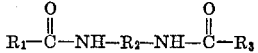

in which $R_1$ and $R_3$ are higher aliphatic hydrocarbon radicals having from 10 to 23 carbon atoms and $R_2$ is a lower alkylene group having from 2 to 8 carbon atoms.

2. A composition of matter comprising a polycarbonate resin and from about ½ percent to about 5 percent of a compound having the general formula

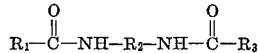

in which $R_1$ and $R_3$ are higher aliphatic hydrocarbon radicals having from 10 to 23 carbon atoms and $R_2$ is a lower alkylene group having from 2 to 8 carbon atoms.

3. A composition of matter comprising a polycarbonate plastic and a compound of the general formula

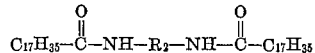

in which $R_2$ is a lower alkylene group having from 2 to 8 carbon atoms.

4. A composition of matter comprising a high molecular weight polycarbonate and from about 0.1 percent to about 10 percent of a compound of the general formula

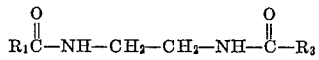

in which $R_1$ and $R_3$ are higher aliphatic hydrocarbon radicals having from 10 to 23 carbon atoms.

5. A composition of matter comprising a synthetic organic polycarbonate and from about 0.1 percent to about 10 percent of ethylene bis(stearamide).

6. A composition of matter comprising a synthetic organic polycarbonate and from about 0.1 percent to about 10 percent of a compound of the general formula

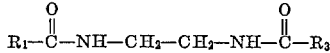

in which $R_1$ and $R_3$ are higher aliphatic hydrocarbon radicals having from 10 to 23 carbon atoms from a mixture of fatty acids.

7. A composition of matter comprising a polycarbonate resin and about 3 percent of a compound having the general formula

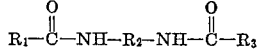

in which $R_1$ and $R_3$ are higher aliphatic hydrocarbon radicals having from 10 to 23 carbon atoms obtained from a mixture of fatty acids and $R_2$ is ethylene.

8. A composition of matter comprising a polycarbonate resin and about 3 percent of a compound having the general formula

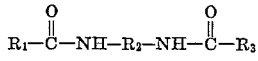

in which $R_1$ and $R_3$ are higher aliphatic hydrocarbon radicals having from 10 to 23 carbon atoms obtained from hydrogenated vegetable oil and $R_2$ is ethylene.

References Cited by the Examiner

UNITED STATES PATENTS 2,789,964  4/1957  Reynolds et al. _____ 260—47 X

MORRIS LIEBMAN, *Primary Examiner.*

D. C. KOLASCH, J. A. GAZEWOOD,
*Assistant Examiners.*